United States Patent
Hansen

(10) Patent No.: US 6,513,709 B1
(45) Date of Patent: Feb. 4, 2003

(54) OPTICAL TRANSACTION CARD SYSTEM

(76) Inventor: Norman F. Hansen, 1766 Marion Ct., Wheaton, IL (US) 60187

( * ) Notice: Subject to any disclaimer, the term of this patent is extended or adjusted under 35 U.S.C. 154(b) by 0 days.

(21) Appl. No.: 09/470,633

(22) Filed: Dec. 22, 1999

(51) Int. Cl.[7] .................................................. G06K 5/00
(52) U.S. Cl. ........................ 235/380; 235/487; 235/454; 380/23; 705/59
(58) Field of Search .................................. 235/380, 487, 235/454; 705/59; 380/23

(56) References Cited

U.S. PATENT DOCUMENTS

| | | | |
|---|---|---|---|
| 4,812,633 A | * 3/1989 | Vogelgesang et al. | ...... 235/487 |
| 4,868,373 A | 9/1989 | Opheij | |
| 5,027,401 A | * 6/1991 | Soltesz | ................... 235/380 X |
| 5,059,774 A | 10/1991 | Kubo | |
| 5,321,751 A | 6/1994 | Ray | |
| 5,436,970 A | 7/1995 | Ray | |
| 5,466,918 A | 11/1995 | Ray | |
| 5,530,232 A | 6/1996 | Taylor | |
| 5,659,741 A | 8/1997 | Eberhardt | |
| 5,668,874 A | * 9/1997 | Kristol et al. | ................. 380/23 |
| 5,756,978 A | 5/1998 | Soltesz | |
| 5,832,488 A | 11/1998 | Eberhardt | |
| 5,907,149 A | * 5/1999 | Marckini | ..................... 235/487 |
| 5,940,363 A | 8/1999 | Ro | |
| 6,076,731 A | * 6/2000 | Terrell | ......................... 235/454 |
| 6,141,438 A | * 10/2000 | Blanchester | ................ 235/380 |
| 6,202,055 B1 | * 3/2001 | Houvener et al. | ............ 705/44 |
| 6,219,652 B1 | * 4/2001 | Carter et al. | ................... 705/59 |
| 6,226,752 B1 | * 5/2001 | Gupta et al. | ................ 713/201 |

FOREIGN PATENT DOCUMENTS

JP   409017038 A   * 1/1997

* cited by examiner

Primary Examiner—Karl D. Frech
Assistant Examiner—Allyson Sanders
(74) Attorney, Agent, or Firm—Meroni & Meroni, P.C.

(57) ABSTRACT

The optical transaction card is used to securely carrying out financial transactions and storing personal information. The optical transaction card is comprised of a first layer, a second layer, and a magnetic strip. The first layer is made of an optical recording medium having a first optical surface and a second optical surface. The optical recording medium has a plurality of concentric tracks radially surrounding the axial center of the optical transaction card. The first layer is optically scanned by focusing a laser beam through the first optical surface. The second layer is adhered to the first layer. The second layer has a first surface and a second surface. The second surface is adhered to the second optical surface of the first layer. The second layer is typically imprinted with the name of the company issuing the card, the name of the cardholder, an identification number, and graphics. The magnetic strip is adhered to the first surface of the second layer and extends horizontally along the first surface. The magnetic strip has a plurality of linear tracks in which information is stored. The information on the magnetic strip being readable by running the magnetic strip across a magnetic reader, allowing the optical transaction card to be used with magnetic reader based transaction systems.

18 Claims, 2 Drawing Sheets

OPTICAL TRANSACTION CARD SYSTEM

BACKGROUND OF THE INVENTION

1. Field of the Invention

The present invention relates to an optical card transaction system for providing greater security by having the ability to verify both the card and the user and for easier exchange of information when performing transactions.

2. Description of the Prior Art

Plastic wallet-sized cards are commonly used to perform a variety of different transactions. These cards are currently being utilized as credit/debit cards for the purchase of products, as a means for identification, and as keys to allow entrance to secured areas. The size of the card and its light weight make these cards ideal for carrying out transactions These cards typically have a magnetic strip running across a surface. This magnetic strip is typically encoded with information pertaining to the cardholder or information needed to perform a particular transaction. This information is typically directly inputted into a computer or other microprocessor based device by scanning the magnetic strip through a magnetic reader.

One drawback to the cards currently being used is that the amount information capable of being stored onto the magnetic strip is limited. The data capacity for a single magnetic strip three inches long and having 3 tracks therein, the type typically found on most conventional credit cards, is roughly 220 bytes. Consequently, the type of information that can be stored on the card is limited, and the type of transactions, which the card can be used for, is limited, as well.

Information which can be utilized to enable the card holder to process more complicated transactions requiring the input of additional information such as an address, phone number, or social security number are often not available on the card. This information is typically manually inputted at the transaction point. Furthermore, information that could be used in order to prevent the fraudulent use of the card such as a digital image of the authorized cardholder or a digital image of the cardholder's signature.

Increased storage capabilities of these cards would also allow for new uses, which are not currently possible. One such use is for the carrying of medical records. A wallet-sized card containing the cardholder's medical records can be easily carried by the cardholder, much like a common credit card, at all times, making the cardholders medical records easily accessible in times of emergency.

Optical disks are commonly used to store and transfer information. An optical disk having a 3⅜ inch diameter can typically store around 35 Megabytes of information. However, these disks are typically not used to perform normal transactions because they require the use of optical scanners which are typically more expensive than the typical magnetic readers used for scanning magnetic strips on typical cards. These optical disks are not compatible with the magnetic readers currently being utilized by most merchants.

Accordingly, there is a need for a wallet-sized card that is capable of storing more information than is currently available on a common wallet sized card having a magnetic strip but is capable of being utilized for transactions requiring the use of a magnetic strip based card.

The present invention is an optical transaction card system with a wallet-sized optical transaction card consisting of one layer which is an optical recording medium capable of optically storing around 35 Megabytes of information and a second layer having a magnetic strip thereon allowing the card to be used in a similar fashion as a typical credit card.

As will be described in greater detail hereinafter, the present invention solves the aforementioned and employs a number of novel features that render it highly advantageous over the prior art.

SUMMARY OF THE INVENTION

Accordingly it is an object of this invention to provide a wallet-sized card that is capable of storing more information than is currently available on a common wallet sized card having a magnetic strip but is capable of being utilized for transactions requiring the use of a magnetic strip based card.

To achieve these objectives, and in accordance with the purposes of the present invention the following optical transaction card for use in securely carrying out a variety of different transactions and for digitally storing personal information is presented.

The optical transaction card is relatively rectangular in shape with two opposing rounded sides and sized to fit in most wallets. The optical transaction card is comprised of a first layer, a second layer, and a magnetic strip.

The first layer is made of an optical recording medium having a first optical surface and a second optical surface. In the preferred embodiment, the optical recording medium has a plurality of concentric tracks radially surrounding the axial center of the optical transaction card. The first layer is optically scanned by focusing a laser beam through the first optical surface.

The second layer is adhered to the first layer. The second layer has a first surface and a second surface. The second surface is adhered to the second optical surface of the first layer. The second layer is typically imprinted with the name of the company issuing the card, the name of the cardholder, an identification number, and graphics.

The magnetic strip is adhered to the first surface of the second layer and extends horizontally along the first surface. The magnetic strip has a plurality of linear tracks in which information is stored. The information on the magnetic strip being readable by running the magnetic strip across a magnetic reader, allowing the optical transaction card to be used with magnetic reader based transaction systems.

The optical transaction card is placed into an optical scanner, which is digitally connected to a first processor means with a printer and a visual display. The information stored on the first layer of the optical transaction card is optically scanned and any information necessary for the completion of the transaction is inputted into the first processor means. Additional information necessary for the determination of whether the transaction is approved such as personal identification codes and merchandise prices are inputted into the first processor means through the use of bar code scanners, data entry terminals, and other means for inputting data.

A communication link is established between the first processor means and a second processor means through which authorization for the transaction can be obtained. Once a communication link is established, information obtained from the optical transaction card and transaction parameters inputted into the first processor is sent to the second processor means.

The second processor means determines whether the transaction is approved and if the transaction is approved, the second processor means sends authorization for the transaction to the first processor means. If the transaction is approved, the first processor means then takes the information obtained from the optical transaction card and inserts this information into a contract or receipt for the transaction. The contract or receipt is then printed out by the printer 33.

In most uses of the optical transaction card, the optical transaction card is used as a credit or debit card in a transaction for the purchase of merchandise. The ability of the optical transaction card to store around 35 Megabytes of information in its first layer makes it particularly useful in carrying out transactions for the purchase of merchandise. Information such as identification code numbers, cardholder name, addresses, phone numbers, birth date, E-mail address, physical description, digital image of the card holder, digital image of the signature, finger prints, palmprints, eye photos, voice prints and other identifying means can be stored on the card.

The optical transaction card allows the seller of the merchandise to verify that the person presenting the optical transaction card is the authorized cardholder. If a card user is purchasing merchandise at a store, the optical transaction card is scanned and the second processor means provides validation by comparing the information stored on the optical transaction card with the authorized card holders information. A person carrying out the transaction can verify that the card user is the authorized cardholder by comparing the digital image of the authorized cardholder or his signature.

The optical transaction card also allows the seller to directly print information onto a contract or receipt eliminating the need to fill out forms or to manually input data. For the purchase of goods occurring over the internet through a website, the first processor means is able to download information from the optical transaction card directly into the website eliminating the need to manually input the information. If the seller has a magnetic reader based transaction system, and has no means to optically scan the optical transaction card, the seller can employ the magnetic strip on the optical transaction card 11 to scan using a conventional magnetic reader.

Other information not usually stored on a conventional credit or debit card but which may be needed to complete a transaction such as the cardholder's insurance company, health records, and demographics could also be stored on the optical transaction card. This allows the optical transaction card to be used in a wide variety of different transactions.

Other objects, features, and advantages of the invention will become more readily apparent upon reference to the following description when taken in conjunction with the accompanying drawings.

DESCRIPTION OF THE PREFERRED EMBODIMENT

Figure 1:
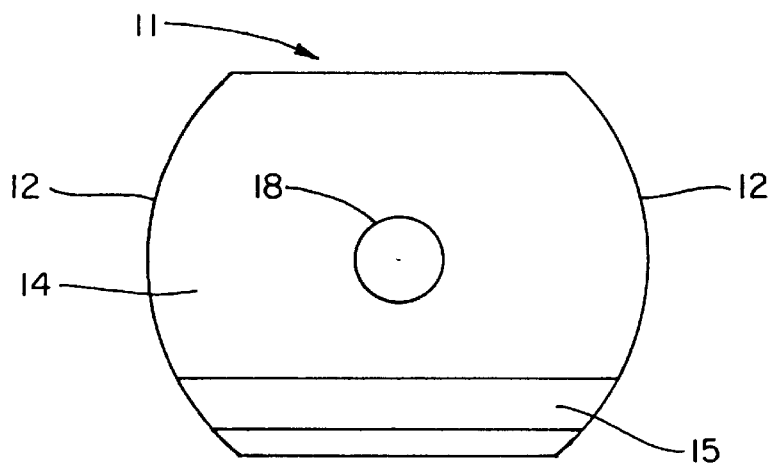
FIG. 1 is a front view of my optical transaction card showing features.
Figure 2:
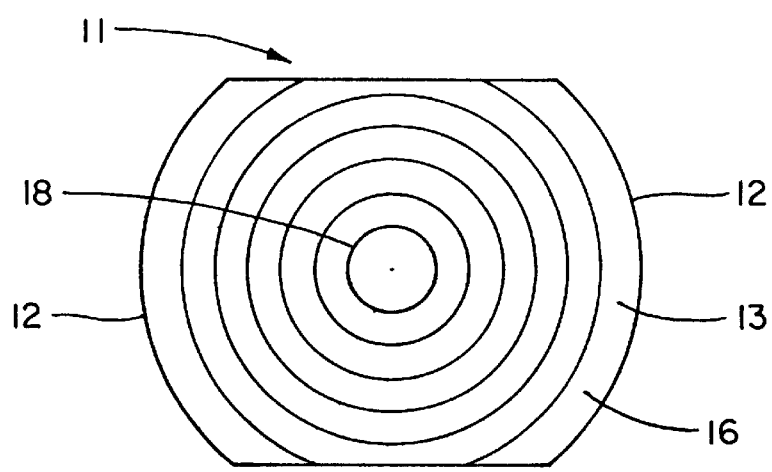
FIG. 2 is a rear view of my optical transaction card shown in FIG. 1.
Figure 3:
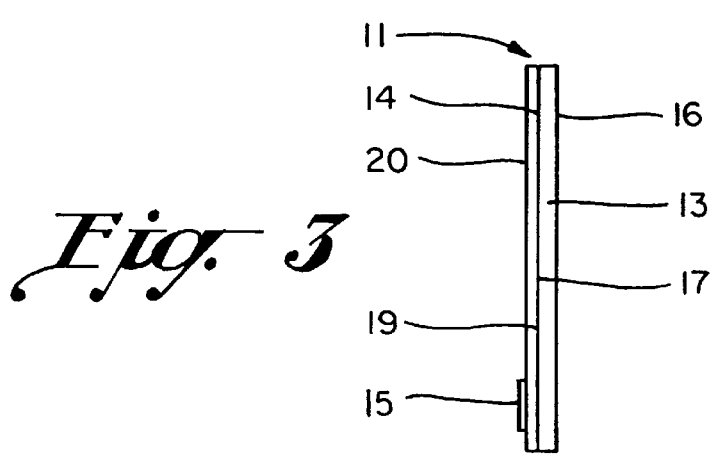
FIG. 3 is a side view of my optical transaction card shown in FIG. 1.

Referring to FIGS. 1, 2 and 3, an optical transaction card 11 for use in securely carrying out a variety of different transactions and for digitally storing personal information. The optical transaction card is relatively rectangular in shape with two opposing rounded sides 12 and sized to fit in most wallets. The preferred size of the optical transaction card 11 is 3⅜ inches long and 2⅛ inches high. In the preferred embodiment, the optical transaction card is comprised of a first layer 13, a second layer 14, and a magnetic strip 15. However, it is possible to have a card with only a first layer and a magnetic strip.

The first layer 13 is made of an optical recording medium having a first optical 16 surface and a second optical surface 17. In the preferred embodiment, the optical recording medium has a plurality of concentric tracks radially surrounding the axial center of the optical transaction card 11. The first layer 13 can hold roughly 35 Megabytes of information. An aperture 18 is located at the center of the optical transaction card 11 in order to allow the optical transaction card 11 to be detachably connected to a rotating scanning means.

The first layer 13 is optically scanned by focusing a laser beam through the first optical surface 17. In the preferred embodiment, a scanning means capable of rotationally scanning a rectangular optical card such as the one disclosed in U.S. Pat. No. 5,059,774 can be employed in order to read or record information in the optical recording medium. There are also linear means for scanning information from a rectangular shaped optical card, but this will require that the tracks in the second layer be arranged in a linear fashion across the optical transaction card, as opposed to the concentric arrangement in the preferred embodiment.

In the preferred embodiment, the second layer 14 is adhered to the first layer 13. The second layer 14 has a first surface 19 and a second surface 20. The second surface 20 is adhered to the second optical surface 17 of the first layer 13. The second layer is preferably made of a thin synthetic plastic film, but other thin materials such as paper can also be used. The second layer 14 is typically imprinted with the name of the company issuing the card, the name of the cardholder, an identification number, and graphics.

The magnetic strip 15 is adhered to the first surface 19 of the second layer 14 and extends horizontally along the first surface. The magnetic strip 15 has a plurality of linear tracks in which information is stored. The information on the magnetic strip 15 being readable by running the magnetic strip 15 across a magnetic reader, allowing the optical transaction card to be used with magnetic reader based transaction systems.

Figure 4:
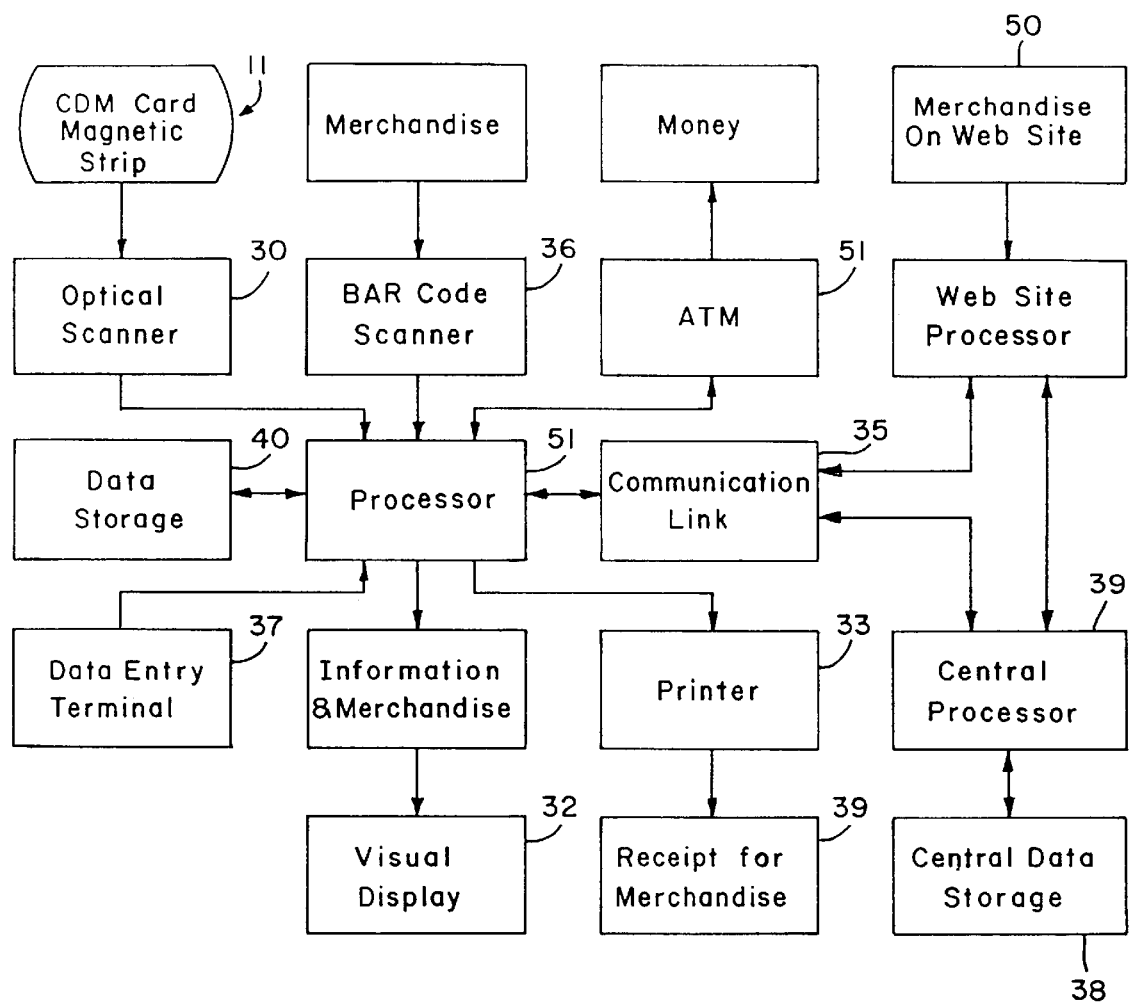
FIG. 4 a schematic of the apparatus for performing a transaction utilizing my optical transaction card.

Referring to FIG. 4, in the preferred method of utilizing the optical transaction card 11, the authorized cardholder presents the optical transaction card 11 at a first institution in order to authorize a transaction. The optical transaction card 11 is then placed into an optical scanner 30 which is digitally connected to a first processor means 31 with a printer 33 and a visual display 32. The information stored on the first layer 13 of the optical transaction card 11 is optically scanned and any information necessary for the completion of the transaction and for verification of the card and the user is inputted into the first processor means 31. Additional information necessary for the determination of whether the transaction is approved such as personal identification codes and merchandise prices are inputted into the first processor means 31 through the use of bar code scanners 36, data entry terminals 37, and other means for inputting data.

A communication link 35 is established between the first processor means 31 and a second processor means 34 through which authorization for the transaction can be obtained. One way in which a communication link can be established is through a website on the internet. Once a communication link is established, information obtained from the optical transaction card 11 and transaction parameters inputted into the first processor is preferably encrypted and sent to the second processor means 34.

The second processor means 34 determines whether the transaction is approved and if the transaction is approved, the second processor means 34 sends authorization for the transaction to the first processor means 31. The second processor means 34 is linked to a second database 38, the second database 38 receiving transaction information and transaction data from the second processor means 34 and then formatting and storing the transaction information and transaction data. The second processor means works in conjunction with the second database to maintain a record of the authorized cardholder's account.

If the transaction is approved, the first processor means 31 then takes the information obtained from the optical transaction card and inserts this information into a contract or receipt for the transaction. The contract or receipt 39 is then printed out by the printer 33. In the preferred embodiment, the first processor means 31 is linked to a first database. The first database 40 is used to store information obtained from the optical transaction card 11 and transaction parameters inputted into the first processor means. This information is then formatted in order to create statistical data.

In most uses of the optical transaction card, the optical transaction card is used as a credit or debit card in a transaction for the purchase of merchandise at a store or over the internet through a web site or for obtaining money from an ATM. The ability of the optical transaction card 11 to store around 35 Megabytes of information in its first layer makes it particularly useful in carrying out transactions for the purchase of merchandise. The optical transaction card allows the seller of the merchandise to verify that the person presenting the optical transaction card 11 is the authorized cardholder and that the information on the optical transaction card 11 is valid. In the preferred embodiment, information such as identification code numbers, logos, trademarks, holograms, cardholder name, addresses, phone numbers, birth date, E-mail address, physical description, digital image of the card holder, digital image of the signature, finger prints, palmprints, eye photos, voice prints and other identifying means can be stored on the card, some of the information stored on the optical transaction card is encrypted or encoded for privacy and greater security.

For the purchase of merchandise at a store, the optical transaction card 11 is placed into an optical scanner 30 which is digitally connected to a first processor 31 means with a printer 33 and a visual display 32. The information stored on the first layer of the optical transaction card 11 is optically scanned and any information necessary for verifying the card, the cardholder and completing the transaction is inputted into the first processor means 31. Additional information necessary for the determination of whether the transaction is approved such as personal identification codes and merchandise prices are inputted into the first processor means through the use of bar code scanners 36, data entry terminals 37, and other means for inputting data.

A communication link 35 is established between the first processor 31 means and a second processor 34 means through which authorization for the transaction can be obtained. Once a secure communication link 35 is established, information obtained from the optical transaction card 11 and transaction parameters inputted into the first processor is sent to the second processor 34 means.

The second processor 34 means decrypts the information from the optical transaction card 11 and uses the data from the data storage 38 to determine whether the card is valid and if the transaction is approved. If approved, the second processor 34 means sends a security code for decrypting the information on the optical transaction card and authorizing the transaction to the first processor 31 means. The first processor 31 means decrypts the information on the optical transaction card 11, displays the decrypted information on the visual display 32, and inserts this information into a contract or receipt for the transaction. The seller of the merchandise can verify that the person presenting the optical transaction card 11 is the authorized cardholder by comparing the cardholder's digital images digital image, signature, and fingerprints. The contract or receipt 39 is then printed out by the printer 33 and signed by the cardholder.

For the purchase of merchandise on the internet through a website 50, the optical transaction card 11 is placed into an user's optical scanner which is digitally connected to a first processor 31 means with a printer 33 and a visual display 32. The information stored on the first layer of the optical transaction card 11 is optically scanned and any information necessary for verifying the card and the cardholder and completing the transaction is inputted into the first processor 31 means. Additional information necessary for the determination of whether the transaction is approved such as cardholder's verification and merchandise prices are inputted into the first processor 31 means using data entry terminal 37 and other means for inputting data.

A communication link 35 is established between the first processor 31 means and a second processor 34 means through which authorization for the transaction can be obtained. Once a secure communication link is established, information obtained from the optical transaction card 11 and transaction parameters is inputted into the first processor is sent to the second processor 24 means.

The second processor 34 means decrypts the information form the optical transaction card and uses the data from the data storage 38 and determines whether the card is valid and if the transaction is approved. If approved, the second processor 34 next verifies that the card user is the authorized by comparing cardholder's digital photo, signature, or finger prints with the information on the optical transaction card. The cardholder uses the data entry terminal to input approval of the agreement. This completes the transaction and the merchandise is shipped. The printer 41 prints out the contract or receipt 42.

For obtaining money using an ATM 51, the optical transaction card 11 is placed into an optical scanner 30, which is digitally connected to a first processor 31 means. The information stored on the first layer of the optical transaction card is optically scanned and any information necessary for verifying the card, the cardholder and completion of the transaction is inputted into the first processor 31 means.

A communication link 35 is established between the first processor 31 means and a second processor 34 means through which authorization for the transaction can be obtained. Once a communication link 35 is established, information obtained from the optical transaction card 11 and transaction parameters inputted into the first processor 31 is sent to the second processor 34 means.

The second processor 34 means decrypts the information using the data for the data storage 35 and determines whether the card is valid and the transaction is approved. If approved, the second processor 34 next verifies that the card user is the authorized by comparing cardholder's digital image, signature, or fingerprints with the information on the optical transaction card 11. If both the card and cardholder's identity are verified, the second processor 34 means sends authorization for the transaction to the first processor 32 means. The first processor 31 means directs the ATM 51 to provide the cardholder the money and a printer 33 prints a receipt 34 for the transaction.

The optical transaction card 11 also allows the seller to directly print information onto a contract or receipt eliminating the need to fill out forms or to manually input data. For the purchase of goods occurring over the internet through a website, the first processor means 31 is able to download information from the optical transaction card 11 directly into the website eliminating the need to manually input the information. If the seller has a magnetic reader based transaction system, and has no means to optically scan the optical transaction card 11, the seller can employ the magnetic strip on the optical transaction card 11 to scan using a conventional magnetic reader.

Other information not usually stored on a conventional credit or debit card but which may be needed to complete a transaction such as the cardholder's insurance company, health records, and demographics could also be stored on the optical transaction card. This allows the optical transaction card to be used in a wide variety of different transactions.

The invention described above is the preferred embodiment of the present invention. It is not intended that the novel device be limited thereby. The preferred embodiment may be susceptible to modifications and variations that are within the scope and fair meaning of the accompanying claims and drawings.

I claim:

1. An optical transaction card for use in securely carrying out financial transactions and for storing personal information, the optical card comprising:
    a first layer, the first layer made of an optical information recording medium and having a first optical surface and a second optical surface, the first optical surface being optically readable by an optical scanner;
    a second layer, the second layer having a first surface and a second surface, the second surface adhered to the second optical surface of the first layer; and
    a magnetic strip, the magnetic strip adhered to the first surface of the second layer, the magnetic strip having data stored therein and allowing the optical transaction card to be used in conjunction with magnetic reader based card transaction systems.

2. The optical transaction card in claim 1 wherein the optical layer has a digital image of the user, a digital image of the user's signature, personal and financial data optically encoded therein.

3. The optical transaction card in claim 1 wherein the optical transaction card is relatively rectangular in shape with a pair of rounded opposing sides and being 3⅜ inches long and 2⅛ inches high.

4. The optical transaction card in claim 1 wherein the second layer is made of a thin synthetic plastic film.

5. An optical transaction card for use in securely carrying out financial transactions and for storing personal information, the optical card comprising:
    a first layer, the first layer is relatively rectangular in shape with a pair of rounded opposing sides and made of an optical information recording medium, the first layer also having a first optical surface and a second optical surface, the first optical surface being optically readable by an optical scanner;
    a second layer, the second layer is relatively rectangular in shape with a pair of rounded opposing sides and having a first surface and a second surface, the second surface adhered to the second optical surface of the first layer; and
    a magnetic strip, the magnetic strip adhered to the first surface of the second layer, the magnetic strip having data stored therein and allowing the optical transaction card to be used in conjunction with magnetic reader based card transaction systems.

6. The optical transaction card in claim 5 wherein the first layer has a card holder's voiceprint and fingerprints encoded therein.

7. The optical transaction card in claim 5, wherein the optical transaction card is used to purchase merchandise over the internet through a web site.

8. The optical transaction card in claim 5, wherein the optical transaction card is used to obtain money from automated teller machine.

9. The optical transaction card in claim 5, wherein the optical transaction card is used to store the cardholder's insurance company, health records, and demographics.

10. A system for performing a transaction, the system comprising:
    an optical transaction card, the optical transaction card having a first layer made of an optical information recording medium, the first layer having transaction information and a digital image of the authorized card holder stored therein;
    an optical scanner, the optical scanner having the optical transaction card removably disposed therein;
    a first processor means, the first processor means capable of downloading information from the optical transaction card through the optical scanner,
    a first database, the first database having a communication link to the first processor means, the first database receiving the transaction information and transaction data from the first processor means and then formatting and storing the transaction information and transaction data to allow a statistical evaluation of the data;
    a visual display; the visual display connected in circuit to the first processor means, the visual display showing the information downloaded from the optical transaction card.

11. The system in claim 10 further comprising a second processor means, the second processor means having a communication link to the first processor means allowing the second processor means to receive the transaction information and transaction data from the first processor means, the second processor also having a means for determining whether the transaction should be approved or disapproved.

12. The system in claim 11 further comprising a second database, the second database having a communication link with the second processor means, the second database receiving the transaction information and transaction data from the first processor means and then formatting and storing the transaction information and transaction data.

13. The system in claim 12 wherein a digital image of the authorized cardowner's signature is stored in the first layer of the optical transaction card.

14. The system in claim 13 wherein the communication link between the first processor means and the second processor means is through a website on the internet.

15. The system in claim 14 further comprising a printer, the printer connected in circuit to the first processor means.

16. The system in claim 15 further comprising a data entry terminal interfaced to the first processor means for the manual input of an identification code into the first processor means.

17. The system in claim 16 further comprising a bar code scanner interfaced to the first processor means.

18. The optical transaction card in claim 1 wherein the optical transaction card is relatively rectangular in shape, the optical transaction card comprising a first pair of opposing edges which are parallel, and a second pair of opposing edges which extend between said first pair of opposing edges, said second pair of opposing edges being outwardly rounded so as to provide an arcuate profile.

* * * * *